United States Patent [19]

Sakakibara et al.

[11] Patent Number: 4,993,387
[45] Date of Patent: Feb. 19, 1991

[54] KNOCK CONTROL SYSTEM FOR INTERNAL COMBUSTION ENGINE

[75] Inventors: Koji Sakakibara, Hekinan; Yoshihiko Hirata, Obu, both of Japan

[73] Assignee: Nippondenso Co., Ltd., Kariya, Japan

[21] Appl. No.: 366,509

[22] Filed: Jun. 13, 1989

[30] Foreign Application Priority Data

Jun. 14, 1988 [JP] Japan .................. 63-146588
Jun. 15, 1988 [JP] Japan .................. 63-147885

[51] Int. Cl.$^5$ ............................... F02P 5/15
[52] U.S. Cl. ........................ 123/425; 123/435
[58] Field of Search ............ 123/425, 435; 73/35

[56] References Cited

U.S. PATENT DOCUMENTS

| | | | |
|---|---|---|---|
| 4,347,820 | 9/1982 | Deleris | 123/425 |
| 4,596,217 | 6/1986 | Bonitz et al. | 123/425 |
| 4,617,895 | 10/1986 | Sakakibara et al. | 123/425 |
| 4,699,106 | 10/1987 | Haraguchi et al. | 123/425 |
| 4,711,212 | 12/1987 | Haraguchi et al. | 123/425 |
| 4,711,213 | 12/1987 | Sakakibara et al. | 123/425 |
| 4,711,214 | 12/1987 | Sakakibara et al. | 123/425 |
| 4,777,920 | 10/1988 | Oshiage et al. | 123/425 |

FOREIGN PATENT DOCUMENTS

| | | |
|---|---|---|
| 2605335 | 8/1977 | Fed. Rep. of Germany . |
| 57-32065 | 2/1982 | Japan . |
| 58-180766 | 10/1983 | Japan . |
| 62-267574 | 11/1987 | Japan . |
| 63-138162 | 6/1988 | Japan . |

Primary Examiner—Tony M. Argenbright
Attorney, Agent, or Firm—Cushman, Darby & Cushman

[57] ABSTRACT

A knock control system for the internal combustion engine is disclosed in which a knock intensity value V is detected from a signal produced by a knock sensor, a cumulative percentage point $V_P$ of distribution of a substantially logarithmic conversion value of the knock intensity value V is detected, a value S corresponding to the standard deviation of the substantially logarithmic conversion value is detected, and a knock decision level $V_{KD}$ is prepared on the basis of $V_P$ and S, thereby controlling knock control factors such as ignition timing and air-fuel ratio. The control system further comprises a device for deciding whether a predetermined period has passed after the engine enters specified operating conditions, a device for averaging knock intensity values, and an update quantity setting device for increasing the unit quantity of updating the averaging device and/or the cumulative percentage point detection device only while the predetermined period has not passed.

14 Claims, 11 Drawing Sheets

⟨CENTRAL VALUE UPDATING ROUTINE⟩

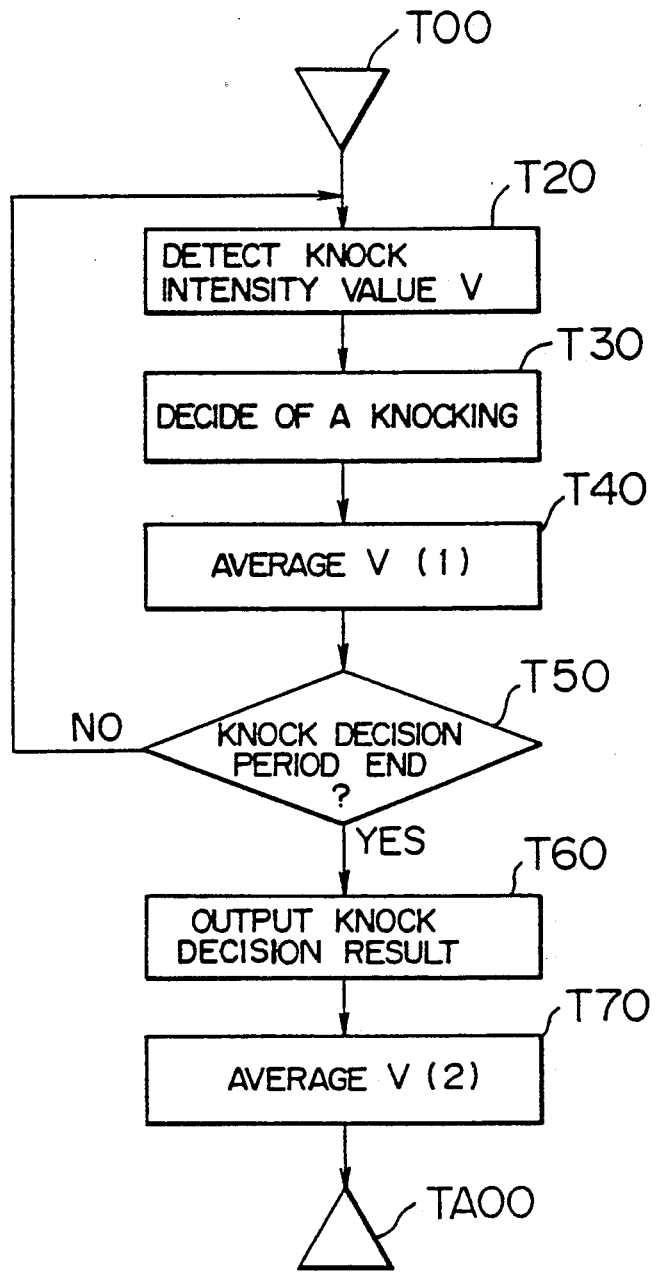

$$r = \frac{\text{COMPUTED VALUE}}{\text{REQUIRED VALUE}}$$

KNOCK CONTROL SYSTEM FOR INTERNAL COMBUSTION ENGINE

BACKGROUND OF THE INVENTION

The present invention relates to what is called a knock control system (KCS) for detecting a knocking generated in an internal combustion engine and controlling knock control factors such as ignition timing and air-fuel ratio.

Generally, a knock decision (discrimination) level $V_{KD}$ is prepared by multiplying an average value $V_{mean}$ of knock sensor signals by a constant K. Such a knock control system poses the problem that the optimum value of the constant K changes dependently on differences of sensors involved in manufacture of them or with lapse of time, thereby making impossible accurate knock detection. In order to solve this problem, a system has been invented for correcting a knock decision level automatically on the basis of the form in which the knock sensor signal is distributed. The disclosures of U.S. Pat. No. 4,617,895 and JP-A-No. 62-267574 are herein incorporated by reference.

Even such a system, however, has the problem that the knock decision is made improperly before the decision level is corrected. The present inventors have studied the reason why accurate knock detection is impossible by the conventional systems of decision level preparation.

As indicated by U.S. Pat. No. 4,617,895, a knock intensity value V (an effective quantity for detecting a knock, such as a maximum peak value within a predetermined section of a knock sensor signal) is based on the logarithmic-normal distribution. FIG. 1 shows a distribution of the knock intensity value V in the total absence of knock as plotted on the logarithmic-normal probability paper. In the Figure, characters (a) and (b) represent assumed distributions with small and large standard deviations (which may be replaced by the variances) of log(V) respectively. The standard deviation of log(V) is naturally subject to changes with differences of sensors involved in manufacture or with lapse of time. The standard deviation of log(V) is referred to because the standard deviation of the knock intensity value V is substantially meaningless among those assuming a logarithmic-normal distribution. This is also the case with the average value $V_{mean}$ and the median value $V_M$. These two values are completely different and coincide with each other only in normal distribution. The value $V_M$ is more significant for a knock sensor signal in a logarithmic-normal distribution. In the description that follows herein, therefore, a knock decision level will be prepared on the basis of the more significant value $V_M$. If a decision level is prepared as $V_D = K \times V_M$ (K=2), for example, the probability of knock decision for (a) is 1% while the figure is 10% for (b). As a result, in an engine having a distribution like (a), knock decision is rarely made in the absence of a knock, and therefore the ignition timing is controlled substantially to the largest advance angle in a system in which the ignition timing is controlled by detecting presence or absence of a knock. For an engine having a distribution like (b), however, its false knock decision cannot be ignored as the ignition timing would be delayed leading to a torque loss even when no knocking has occurred. Apart from the foregoing cases where no knocking occurs, the inconvenience is that a knocking, if occurred, may not be decided as so. In a system of decision level preparation using $V_{KD} = K \times V_M$ or $V_{KD} = K \times V_{mean}$, therefore, accurate knock detection is impossible for different standard deviations of log(V). Specifically, such a system only can meet the situation in which the magnitude alone of the knock sensor signal undergoes a change and does not take the standard deviation of log(V) into consideration.

The technique suggested in JP-A-No. 62-267574 is capable of meeting the change in the variance of the log(V) distribution. Specifically, in this system, the knock decision level is prepared as $V_{KD} = A \times D \times V_M$ (D: Constant), where A is a quantity subject to change in accordance with the variance of the log(V) distribution. The change in variance due to variations of engine or knock sensor can thus be absorbed.

Since the frequency at which the value A is updated is almost the same as that for knock decision, however, the updating rate is low, with the result that it takes a long time before a knock decision level is corrected to an optimum value.

SUMMARY OF THE INVENTION

The object of the present invention is to obviate these problems.

According to the present invention, there is provided a knock control system for an internal combustion engine, comprising a knock sensor for detecting a knocking of an internal combustion engine, knock intensity detection means for detecting a knock intensity value V effective for knock detection from a signal produced from the knock sensor, knock decision means for deciding on the presence or absence of a knocking by comparing the knock intensity value with a knock decision level, knock control means for controlling knock control factors including ignition timing and air-fuel ratio in accordance with the result of decision, cumulative percentage point detection means for detecting a cumulative percentage points $V_P$ of a distribution of a substantially logarithmic conversion value of the knock intensity value V, standard deviation detection means for detecting a value S corresponding to the standard deviation of a substantially logarithmic conversion value of the knock intensity value, and knock decision level preparation means for preparing a knock decision level $V_{KD}$ on the basis of the value S corresponding to the cumulative percentage point $V_P$ and the standard deviation.

In operation, the cumulative percentage point $V_P$ of the distribution of the substantially logarithmic conversion value of the knock intensity value V detected by the knock intensity value detection means is detected by the cumulative percentage point detection means, and a value S corresponding to the standard deviation of the substantially logarithmic conversion value of the knock intensity value v is detected by the standard deviation detection means. Then a knock decision level is prepared on the basis of the cumulative percentage point $V_P$ and the value S corresponding to the standard deviation. This knock decision level is compared with a knock intensity value at the knock decision means thereby to decide whether a knocking has occurred or not.

According to another aspect of the invention, the knock decision level $V_{KD}$ is preferably prepared as $S^n \times V_P$ and updated in such a manner that the cumulative percentage point $V_P$ is a cumulative 50% point $V_M$ and the probability of attaining the relations $V_M/S \leq V \leq V_M$ for a standard deviation is one third.

According to still another aspect of the invention, the knock decision level $V_{KD}$ should better be prepared in the form of $S^3 \times V_M$.

According to a further aspect of the invention, means is provided for correcting, by a predetermined constant, the knock decision level prepared on the basis of the value S corresponding to the standard deviation and the cumulative 50% point $V_M$.

BRIEF DESCRIPTION OF THE DRAWINGS

FIG. 10 is a flowchart showing a timer interrupt routine according to another embodiment of the present invention.

DESCRIPTION OF THE PREFERRED EMBODIMENTS

Figure 1:
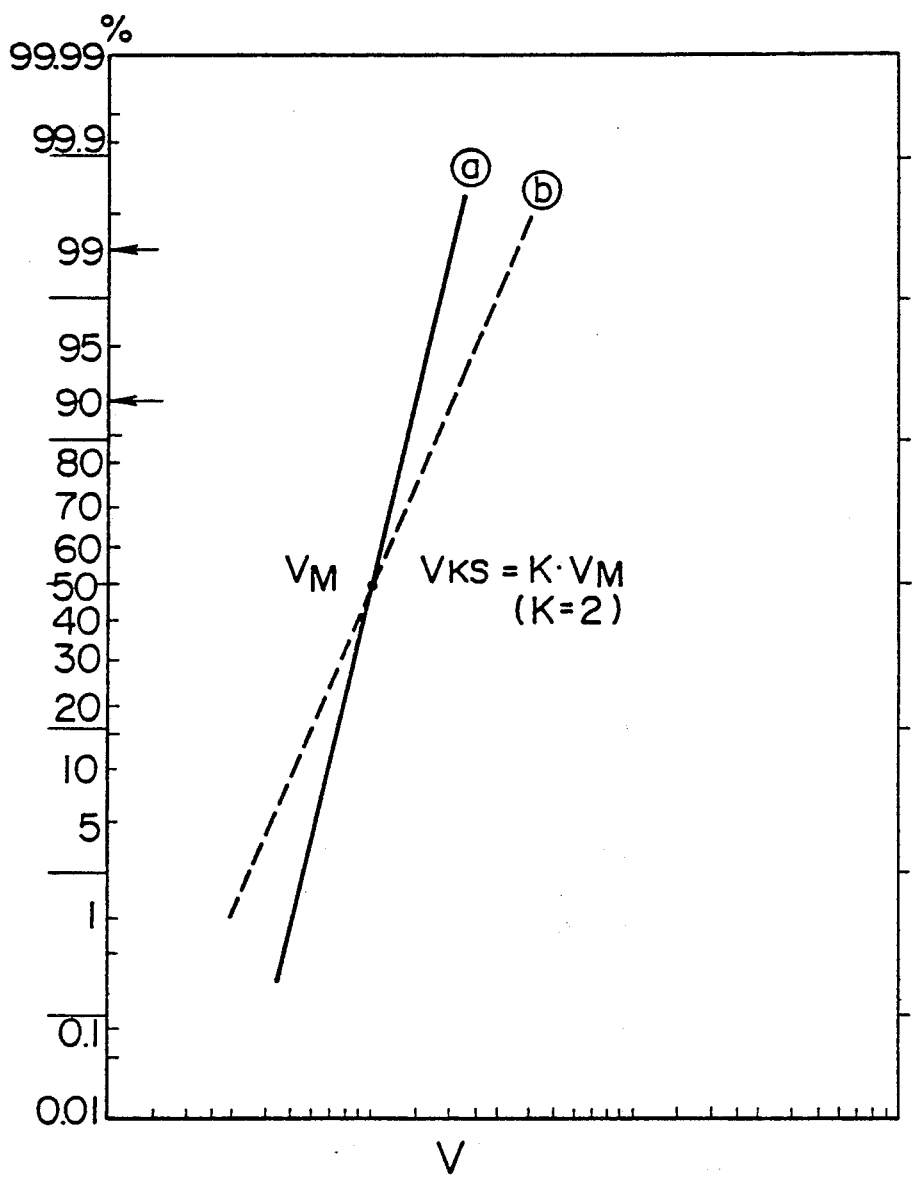
FIG. 1 is a diagram showing a distribution characteristic plotted on the logarithmic-normal probability paper of a knock intensity value V.
Figure 2:
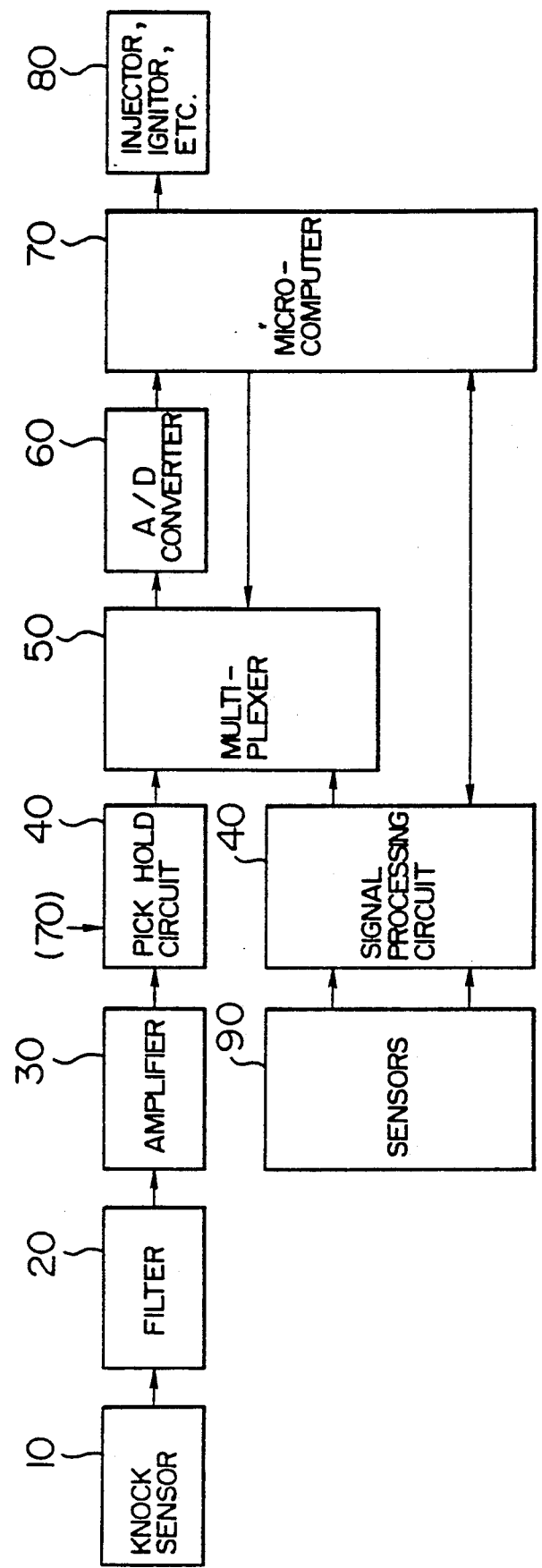
FIG. 2 is a block diagram showing an embodiment of the present invention.

A system according to the present invention is schematically shown in FIG. 2. Reference numeral 10 designates a knock sensor for detecting a knock generated in an engine, numeral 20 a filter for extracting a knock-related component from a signal of the knock sensor, numeral 30 an amplifier for amplifying the signal after being passed through the filter, numeral 40 a peak hold circuit, numeral 50 a multiplexer for selecting an input signal to an A/D converter, numeral 60 an A/D converter for converting an analog signal into a digital signal, numeral 70 a microcomputer for computing an ignition timing, amount of fuel injection, etc. on the basis of the information obtained from various sensors including the knock sensor, numeral 80 an ignitor, injector or the like for realizing the result of computation. Numeral 90 designates various sensors such as a crank angle sensor, intake air amount sensor or water temperature sensor, and character AO a signal processing circuit for processing signals produced from the sensors.

Figure 3:
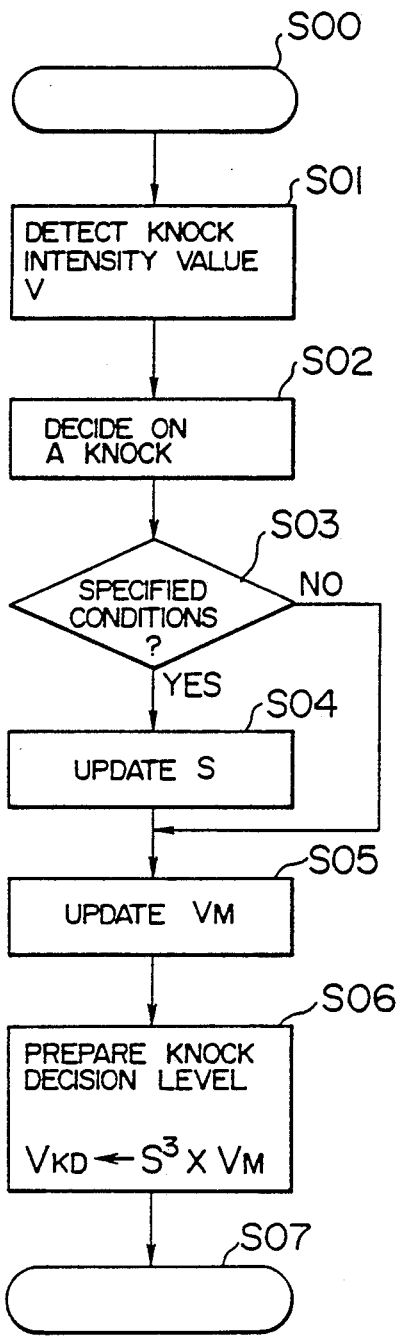
FIGS. 3, 4 and 6 are flowcharts for explaining the system shown in FIG. 3.

A flowchart for preparing a knock decision level $V_{KD}$ and making a knock decision is shown in FIG. 3. This routine starts with step S00, followed by step S01 for detecting a knock intensity V. The knock intensity value V is, for example, a peak hold value of a knock sensor signal within a predetermined crank angle. Step S02 makes a knock decision. If $V \geq V_{KD}$, it is decided that there occurs a knock. In accordance with the result of this decision, the ignition timing or the like is controlled in a control region (such as a heavy load region).

Step S03 decides whether the engine operating conditions meet specific conditions which are defined by any one or combination of the following conditions:

(1) The engine load more than a predetermined value
(2) The engine speed within a predetermined range
(3) The change rate of engine load less than a predetermined value.
(4) The value $V_M$ within a predetermined range If the answer at step S03 is "Yes", the process proceeds to step S04, while if the answer is "No", the process is passed to step S05. S04 updates the value S corresponding to the standard deviation of the log(V) distribution (as described in detail later). Step S05 updates the central value $V_M$ of the V distribution (as described in detail later). Step S06 prepares a knock decision level $V_{KD}$ from the equation shown below.

$$V_{KD} = S^3 \times V_M$$

Figure 4:
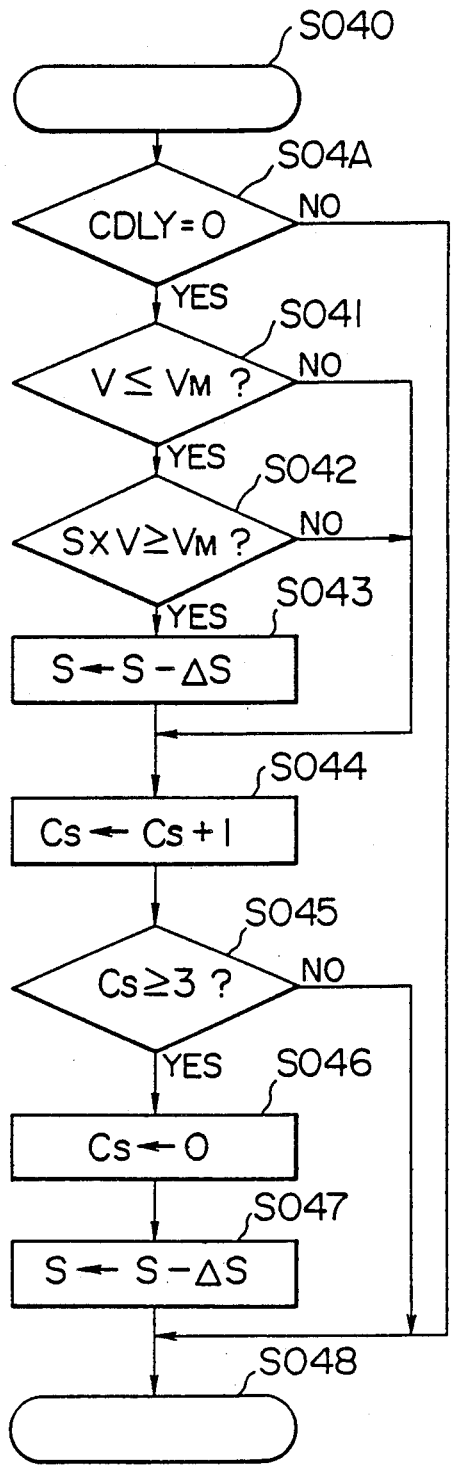

A detailed flowchart of step S04 is shown in FIG. 4. This routine starts with step S04. Step S04A tests to determine whether a counter CDLY (described in detail later) for deciding on a predetermined period is set to zero, and if the answer is "Yes", the process proceeds to step S041, while if the answer is "No", the process is passed to step S048 to end the routine. Step S041 decides whether $V \geq V_M$, and if the answer is "Yes", the process proceeds to step S042, and if the answer is "No", to step S044. Step S042 decides whether $S \times V \geq V_M$, and if the answer is "Yes", the process proceeds to step S043, while if the answer is "No", the process is passed to step S044. Step S043 reduces the value S by $\Delta S$. Step S044 counts up an S-updating counter $C_S$ by one. Step S045 decides whether $C_S \geq 3$, and if the answer is "Yes", the process proceeds to step S046, and if the answer is "No", to step S048. Step S046 clears the counter $C_S$. Step S047 increases the value S by $\Delta S$. Step S048 ends the routine.

Figure 5:
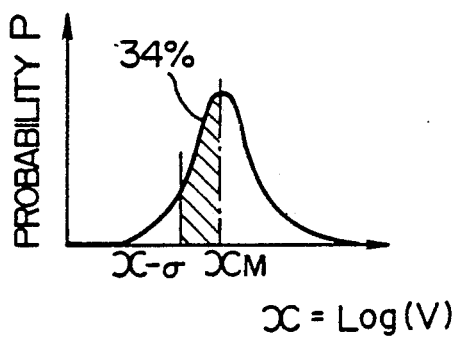
FIGS. 5 and 8A to 8C are diagrams showing distribution characteristics of the knock intensity value V.

The reason why S takes a value corresponding to the standard deviation of the log(V) distribution in the process shown in FIG. 4 will be explained with reference to FIG. 5. Assume that the central value $x_M$ of the distribution of $x = \log(V)$ is $x_M = \log(V_M)$, and the point $-\sigma$ is given as $x_{-\sigma} = \log(V_M) - \sigma_x$ ($\sigma_x$: Standard deviation of distribution of x). The integration of the probability of the hatched portion in the drawing is given as $$\int_{x_{-\sigma}}^{x_M} P(x)dx = 0.34.$$

This indicates that the probability of being $x_{-\sigma} \leq x \leq x_M$ is 0.34. According to the process shown in FIG. 4, on the other hand, the value S is corrected in such a manner that the probability of being $V_M/S \leq V \leq V_M$ is one third (about 33%). Specifically, the expectation of the amount of change in S per cycle is given as $$K_S = \int_{V_M/S}^{V_M} P(V)dV \times (-\Delta S) + \frac{\Delta S}{3}$$

S is thus converged to a value satisfying the condition $$\int_{V_M/S}^{V_M} P(V)dV = 1/3$$

associated with $K_S=0$. The relations below thus hold.

$$\sigma_x \approx \log(S)$$

If $V_{KD}$ is prepared as $S^3 \times V_M$ by use of this value S, $V_{KD}$ is set to the point 3 $\sigma$ in the log(V) distribution ($3 \times \sigma$ on the logarithmic axis is equivalent to $S^3$ on the real number axis).

Figure 6:
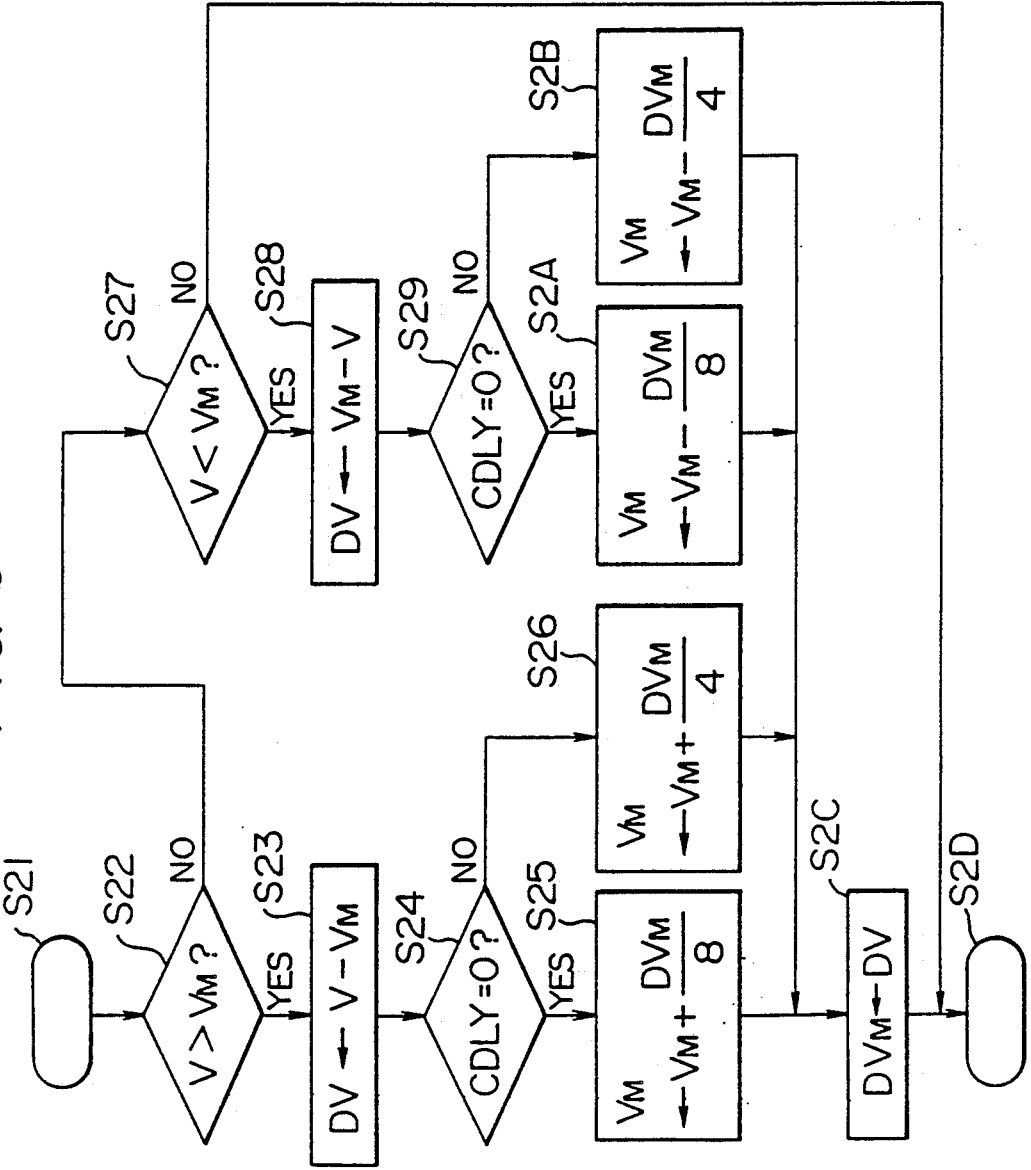

Now, the process of step S05 will be explained in detail with reference to FIG. 6. An updating routine starts with step S21, and step S22 tests whether V is larger than $V_M$. If the answer at this step is "Yes", the process proceeds to step S23 for storing $(V-V_M)$ in a RAM called DV. Step S24 tests whether CDLY is zero, and if the answer is "Yes", the process proceeds to step S25, while if the answer is negative, the process is passed to step S26. Step S25 increases the value $V_M$ by $DV_M/8$. Step S26, on the other hand, increases the $V_M$ by $DV_M/4$. If the answer is "No" at step S22, the process proceeds to step S27, where whether V is smaller than $V_M$ is tested, and if the answer is "Yes", the process proceeds to step S28, while if the answer is "No", step S2D is followed. Step S28 stores $(V_M-V)$ in DV. Step S29 tests to determine whether CDLY is zero, and if the answer is "Yes", the process is passed to step S2A, while if the answer is negative, the process is passed to step S2B. Step S2A reduces $V_M$ by $DV_M/8$, while step S2B decreases $V_M$ by $DV_M/4$. Step S2C stores the data in DV in $DV_M$. Step S2D ends this routine. In the foregoing description, the values S and $V_M$ are updated by cylinder.

According to this embodiment, the knock decision level $V_{KD}$ can be set at the point $+3\sigma$ in the log(V) distribution, and therefore even under a great change in V variance, a knock is decided erroneously only with a probability which is always as low as $$\int_{S^3 \times V_M}^{\infty} P_{(v)} dV = 0.0013$$

and is negligible.

Instead of setting $V_{KD}$ to a value corresponding to the point 3 $\sigma$ in the log(V) distribution as in this embodiment, it may be changed between for example the point 3.5 $\sigma$ and 2.5 $\sigma$ as required. In such a case, the computation of $S^n$ which is somewhat inconvenient may be accomplished by a method in which the results of computation of $S^n$ (1.0 to 4.1 for n=3.5) against the value S corresponding to the standard deviation in a given range (say, 1.0 to 1.5) are written in the ROM in advance and obtained by table search. This method is very effective in the case where the microcomputer requires a long time in multiplication process if the value of n is integral.

The S-updating counter which is set to 3 according to the present embodiment to correspond to the standard deviation of the log(V) distribution may alternatively be set to other values. If $C_S=4$, for example, S is updated in such a manner that $$\int_{V_M/S}^{V_M} P_{(v)} dV = 1/4,$$

which is equivalent to a quantity corresponding to 0.67 $\sigma_x$ (0.67 $\sigma_x = \log(S)$) from the normal distribution table. As a result, if $$V_{KD} = S^{\frac{3}{0.67}} \times V_M.$$

it is possible to set a knock decision level at point 3 $\sigma$.

Also, the central value $V_M$, which is used to prepare $V_{KD}$ according to the embodiment under consideration, may be replaced with other value of a cumulative percentage point. If the cumulative 16% point is $V_{16}$, for instance, it is possible to set to point 3 $\sigma$ for $V_{KD}=S^4 \times V_{16}$.

Further, in order to change the control knock level in accordance with the engine conditions or cylinders, the decision level may be corrected by use of a constant. For example, use $V_{KD}=S^3 \times C \times V_M$ (C: A constant set in accordance with the engine conditions or cylinder).

It is also effective to limit the value S within a predetermined range as required.

It is also effective to limit the knock decision level within a predetermined range as required.

The logarithmic conversion of V, which is not applied to the present invention according to the embodiment under consideration, may be used for the present invention with equal effect. In such a case, the only difference is to use a different equation like $(V_M+3\times S)$ for point 3 $\sigma$.

Figure 7:
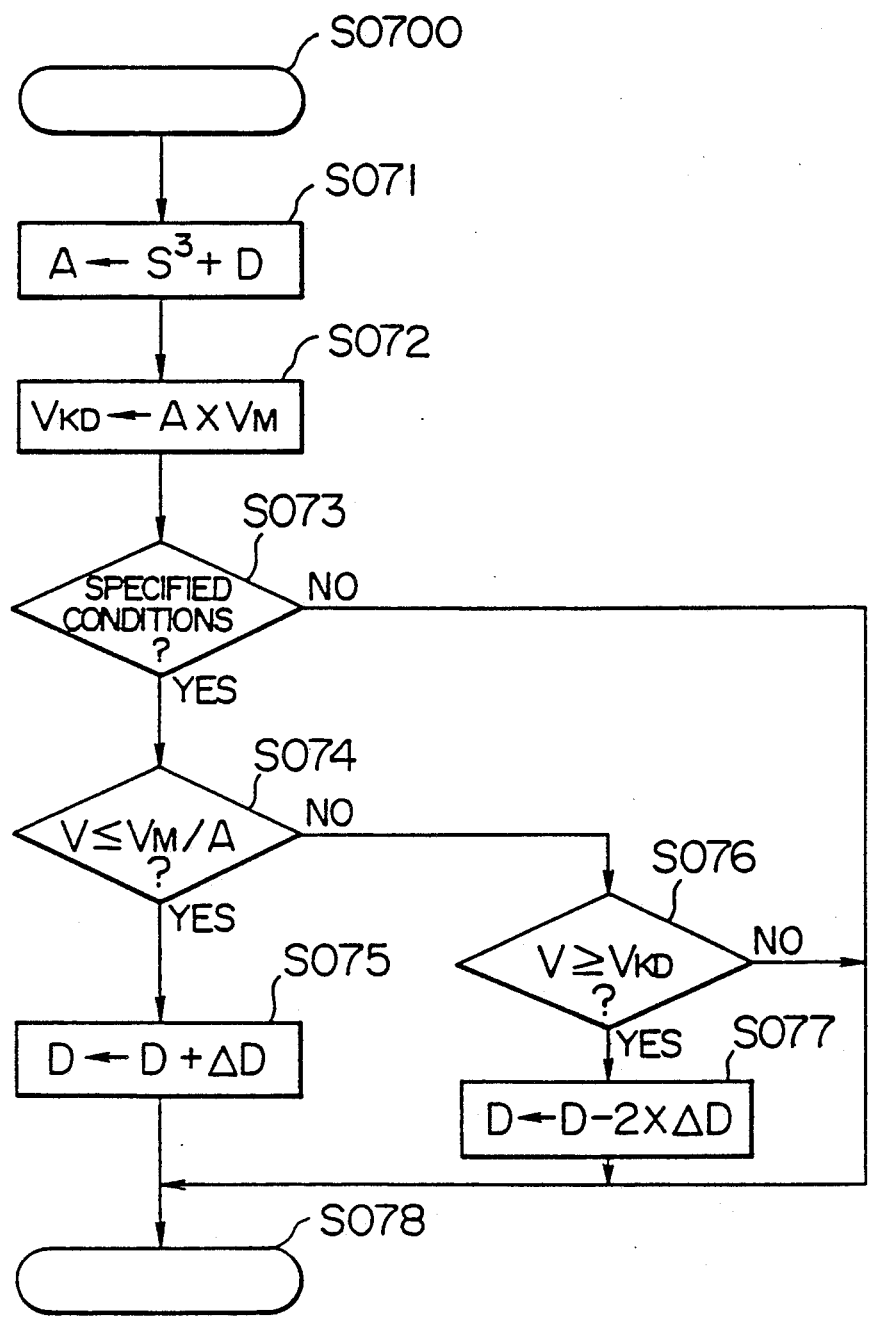
FIG. 7 is a flowchart for explaining the operation of a modification of the system according to the present invention.

The present invention may also be combined with the technique disclosed in U.S. Pat. No. 4,617,895 effectively. An example of such a combination will be explained with reference to the flowchart of FIG. 7. This shows a process replacing the step S06 in FIG. 3 and other steps may be the same as mentioned above.

The main routine starts at step S0700, and step S071 computes the variable A as $S^3+D$. step S072 decides whether the engine operating conditions or a knock sensor signal has satisfied specified conditions, and if the answer is "Yes", the process proceeds to step S074, while if the answer is "No", the process is passed to step S078. The specified conditions are for example, that:

(i) The engine load is more than a predetermined value.
(ii) The engine speed is within a predetermined range.
(iii) The rate at which the engine speed changes is lower than a predetermined value.
(iv) The value $V_M$ is within a predetermined range.

Step S074 decides whether $V \leq V_M/A$, and if the answer is "Yes", the process proceeds to step S075, while if the answer is negative, the process is passed to step S076. Step 075 increases D by $\Delta D$. Step S076 decides whether $V \leq V_{KD}$, and if the answer is affirmative, the process is passed to step S077, while the process proceeds to step S078 otherwise. Step 077 reduces D by $2 \times \Delta D$. Step S078 ends the main routine. The value D is not necessarily positive but may be negative.

As described above with reference to an embodiment, the present invention has effects mentioned below.

(1) In view of the fact that a knock decision level is prepared on the basis of the standard deviation S of the log(V) distribution, an accurate knock decision is made possible against change in V variance due to the variations in engine or knock sensor.

(2) The value S may be updated more frequently (once for every three cycles as in the embodiment under consideration), and therefore a decision level may be corrected to a proper value quickly.

(3) By conceiving an appropriate method of updating S, the value S works to correct any deviation of $V_M$ from a correct value which may occur at such time as transient period, thus permitting accurate knock detection under transient conditions.

Although the present invention is an improvement of the techniques disclosed in U.S. Pat. No. 4,617,895 and JP-A-No. 62-267574, the features (2) and (3) mentioned above are specific to the present invention but not found in the above references.

Figure 8A:
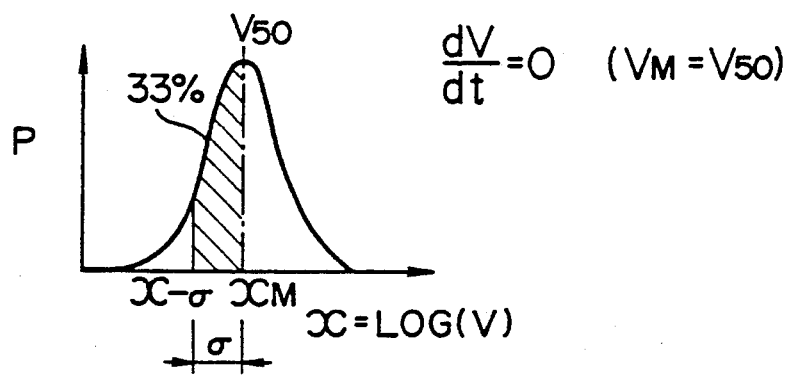
Figure 8B:
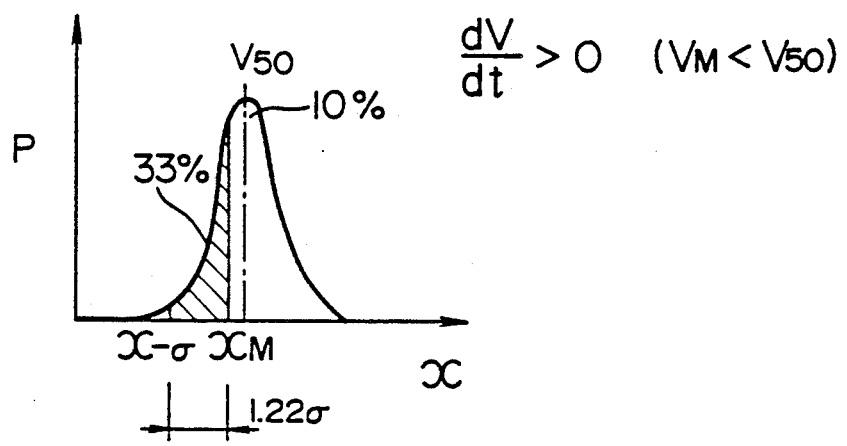
Figure 8C:
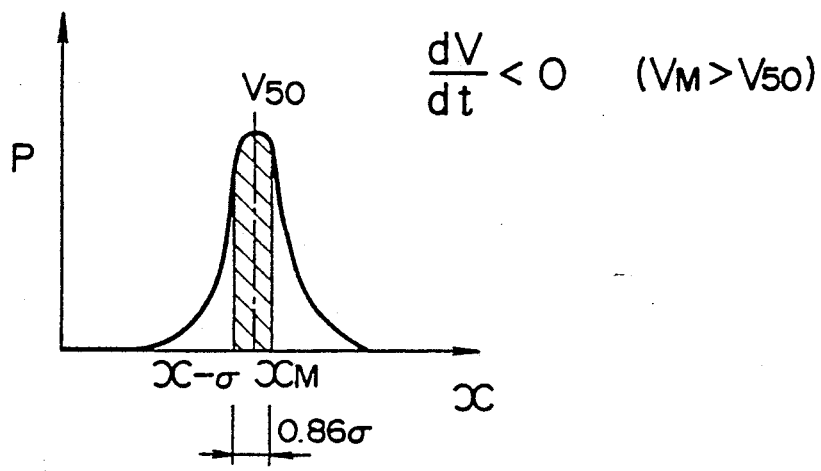

The effect (3) will in particular be explained additionally by use of FIGS. 8A to 8C. When dV/dt is larger than zero as under acceleration, $V_M$ becomes somewhat smaller than the true value as shown in FIG. 8B. (Under steady condition, the value $V_M$ coincides with the true value as shown in FIG. 8A) If $V_M$ is at a cumulative 40% point, for example, $$\int_{V_M}^{V_{50}} P(V)dV = 10\%$$

($V_{50}$: True value of median value), and therefore if $$\int_{V_M/S}^{V_M} P(V)dV = 33\%$$

is to be satisfied, S is corrected so that $$\int_{O}^{V_M/S} P(V)dV = 7\%,$$

that is, $V_M/S$ is converted to the cumulative 7% point. The cumulative 40% point and 7% point correspond to $-0.25 \, \sigma$ and $-1.47$ point respectively (as determined from the normal distribution table). Therefore, S is finally corrected to a quantity corresponding to $+0.25 + 0.61 = 0.86 \, \sigma$, and thus assumes a value smaller than the true value, thereby correcting the deviation of $V_M$ from the true value.

Figure 9:
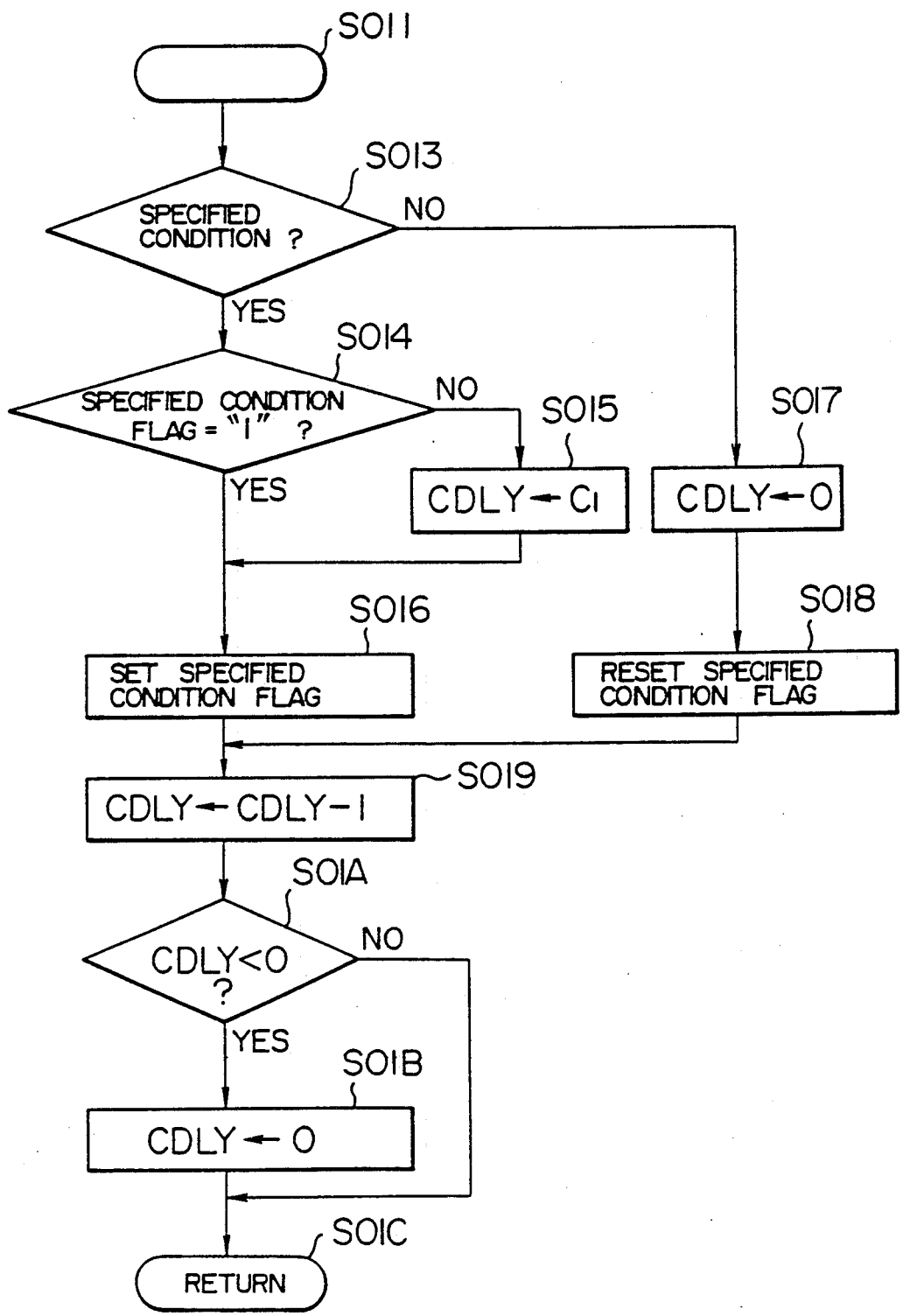
FIG. 9 is a flowchart showing details of the decision routine in FIGS. 4 and 6.

Now, a specified period decision routine by a counter CDLY used in the flowcharts of FIGS. 4 and 6 will be explained in detail with reference to FIG. 9. This routine starts with step S011. Step S013 decides whether the engine is under specified conditions including any one or combination of the following:

(1) The engine is in high load region.
(2) The change in engine speed is more than a predetermined value.
(3) The engine speed is within a predetermined range.

If step 013 decides that the specified conditions are met, the process proceeds to step S04, while if the answer at step S017 is negative, the process is passed to step S017. Step 014 tests whether the specified condition flag is "1", and if the answer is "Yes", the process is passed to step S016, while if the answer is "No", the process proceeds to step S015. Step S015 sets a counter CDLY for deciding on a predetermined period to a predetermined value $C_1$. Step S016 sets a specified condition flag. Step S017 clears the counter CDLY. Step S018 resets the specified condition flag. Step S019 decrements the counter CDLY by one count. Step S01A tests whether CDLY is negative or not, and if the answer is "Yes", the process proceeds to step S01B, while if the answer is "No", the process is passed to step S01C. Step S01B guards the counter CDLY to zero. This routine ends at step S01C. In this way, the counter CDLY is kept at a count other than zero for a predetermined period from the time when the specified conditions are established.

Figure 11:
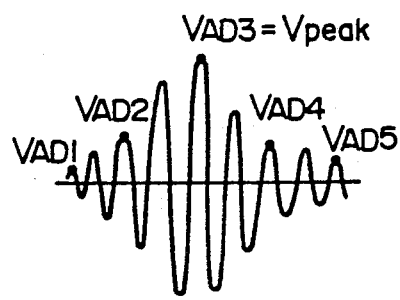
FIG. 11 is a diagram showing an output waveform of a knock sensor and A/D conversion points.

FIG. 10 shows a timer interrupt routine according to another embodiment of the present invention. This interruption is set by a flowchart not shown in such a manner that the start of detection of a knock intensity value coincides with a predetermined crank angle (say, 10° CA ATDC). The timer interrupt routine starts with step T00. First, step T20 detects a knock intensity value V, which is, for instance, a maximum value $V_{ADj}$ (j: 1, 2, ..., n) of a knock sensor signal or a maximum value $V_{peak}$ thereof as shown in FIG. 11. Step T30 makes a knock decision by counting the number CPLS which satisfies the condition $V_{AD} \geq V_{ref}$. When CPLS is more than a predetermined value, it is decided that a knocking has occurred. Step T40 conducts the first "dampening" process for $V_{AD}$ in the manner mentioned below.

$$V_{MADj} = V_{MADj-1} + \frac{V_{MADj} - V_{MADj-1}}{16}$$

Step T50 decides whether the knock decision section has ended, and if the answer is "Yes", the process proceeds to step T60, while if the answer is "No", the process is returned to step T20. Step T60 sends the result of decision whether a knocking has occurred or not to the microcomputer 60 through a port.

Step T70 averages out V for the second time (as described in detail later). Step TA00 ends this routine.

Figure 12:
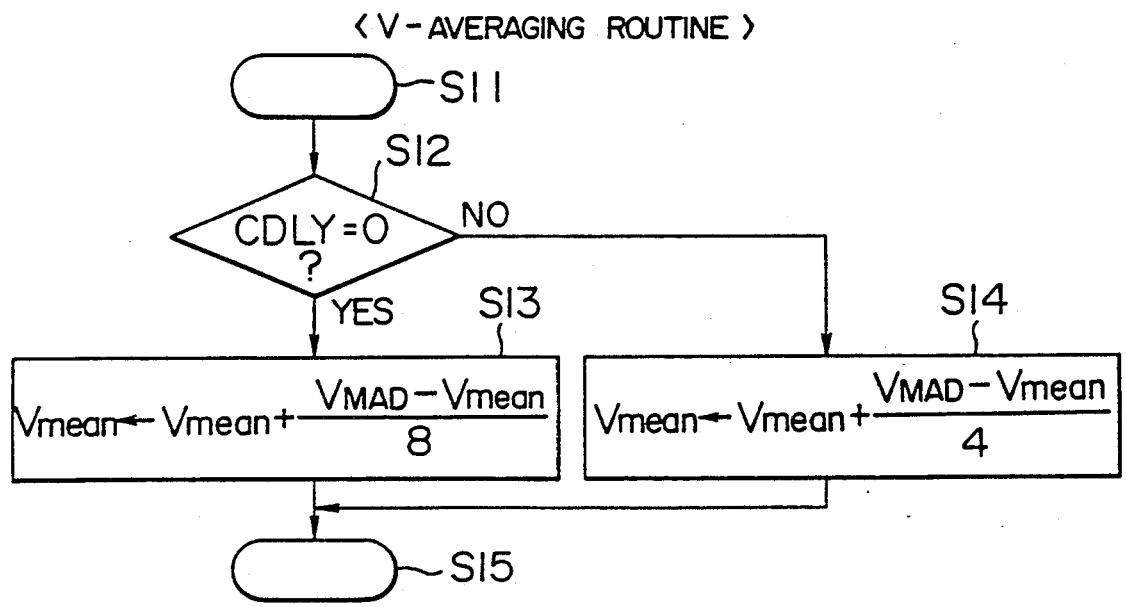
FIG. 12 is a diagram showing details of an averaging routine in FIG. 10.

FIG. 12 shows an averaging routine for V executed at step T70 of FIG. 10. This routine starts with step S11, and S12 tests whether CDLY is zero or not. If the answer at this step is "Yes", the process is passed to step S13. Step S13 updates the value $V_{mean}$ by $$\frac{V_{MAD} - V_{mean}}{8}.$$

If the answer at step S12 is "No", the proceeds to step S14 for updating $V_{mean}$ by $$\frac{V_{MAD} - V_{mean}}{4}$$

Step S15 ends this routine. The specified period decision routine by the counter CDLY is identical to that in the flowchart of FIG. 10.

Now, explanation will be made about the reason why a unit updating quantity of $V_M$ or $V_{mean}$ is increased during a predetermined period after the engine has come to satisfy the specified conditions.

The inventors have found an important fact by theoretical analysis of the responsiveness of $V_{mean}$, as explained below.

Figure 13A:
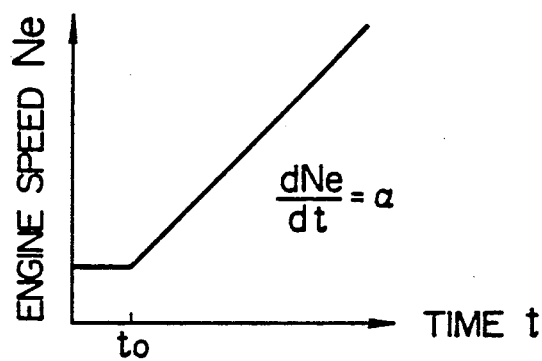
FIGS. 13A-13C, 14A, 14B, 15A and 15B show various characteristics for explaining the present invention.
Figure 13B:
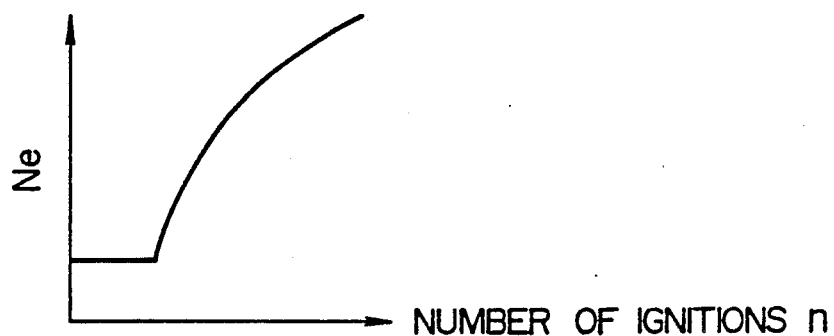

First, assume an accelerated operation mode as shown in FIG. 13A. According to the result of experiments conducted by the inventors, a knock sensor signal V is expressed as $$V = V_O N_c^\beta \tag{1}$$

where $V_O$ and $\beta$ are constants ($\beta \approx 2.0$). If the number of ignitions for a given cylinder is n, $$dN_c/dn = dN_3/dt \cdot dt/dn = 120 \, \alpha/N_c \tag{2}$$

where $N_e$ is a unit of rpm. In other words, $dN_e/dn$ becomes smaller with the increase in $N_e$, and undergoes a change as shown in FIG. 13B. Approximation with $\beta=2.0$ leads to the relationship below.

$$dV/dn = dV/dN_e \cdot dN_e/dn = 240 \, \alpha V_O \qquad (3)$$

Figure 13C:
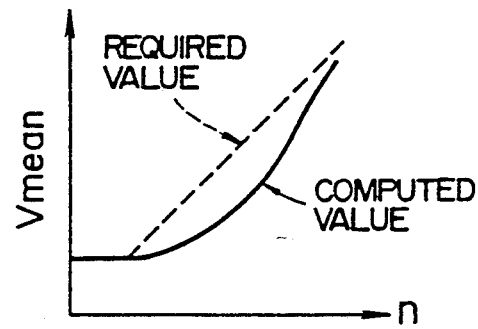

This indicates that V changes linearly with n, and assumes a form as shown by dashed line in FIG. 13C.

In relation to this required value V, assume that $$V_{mean(n)} = V_{mean(n-1)} + \frac{V_{(n)} - V_{mean(n-1)}}{N}$$

(where N is an integer such as 4, 8 or 16) Then, the value $V_{mean}$ undergoes a change in the manner shown by solid line in FIG. 13C. This value N may be used to regulate the stability and responsiveness of $V_{mean}$.

Figure 14A:
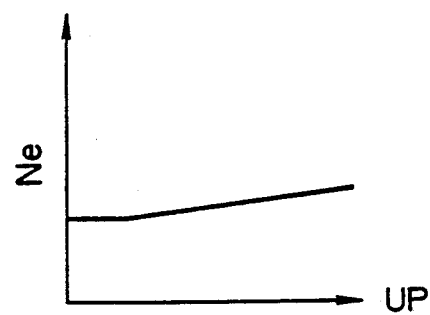
Figure 14B:
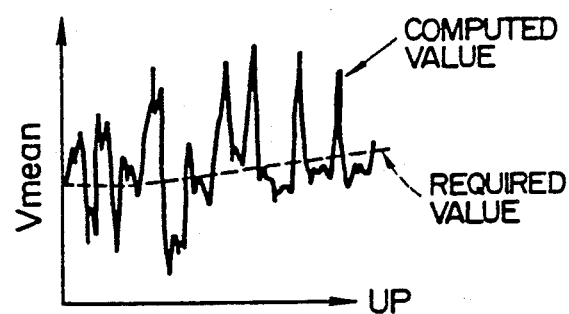

FIG. 14A, on the other hand, assumes a case of slow acceleration mode where $dN_e/dt=\alpha$ is small. If N is reduced with an increased response, the stability is deteriorated as indicated by solid line in FIG. 14B.

From these facts, one may be easily induced to conclude that N should be reduced to raise response if the value $\alpha$ is large, while the value N should be increased for higher stability when the value $\alpha$ is small.

If $\alpha \geq 1500$ rpm/s, for instance, N may be set to four and if $\alpha$ is less than 1500 rpm/s, N is determined at eight.

This method, however, fails to achieve both stability and response successfully at the same time. Because if N is set to four, the variation in $V_{mean}$ itself increases in spite of a reduced response delay, and therefore the error with the required value is not expected to decrease very much.

Figure 15A:
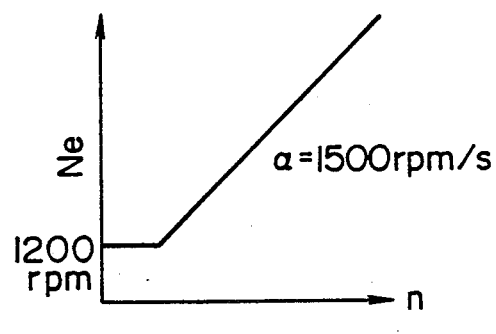
Figure 15B:
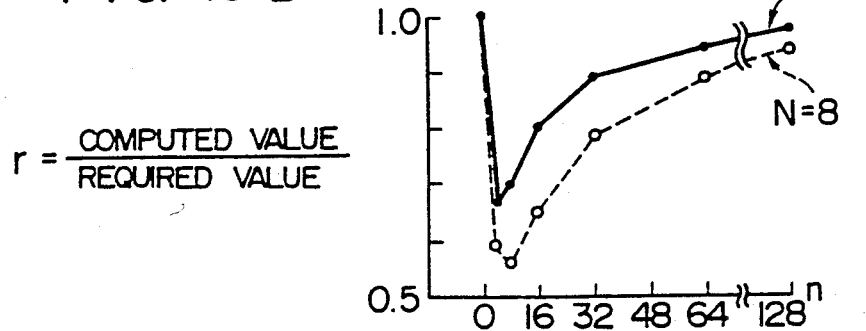

The inventors studied the ratio $\gamma$ of the computed value against the required value under sharp acceleration. FIG. 15A shows a case assuming a sharp acceleration mode from $N_e=1200$ rpm to $\alpha=1500$ rpm/s. FIG. 15B shows the value $$\gamma = \frac{\text{Computed value}}{\text{Required value}}$$

in this mode computed and plotted appropriately. An important fact revealed from FIG. 15B is that the value $\gamma$ remains small (large in response) only during initial stage of acceleration, and with the increase in N, $V_{mean}$ is converged to the required value if n increases.

More specifically, later stages of acceleration are accompanied by a behaviour of the required value similar to that under steady conditions in spite of the required value changing like in the initial stages of acceleration (because of a sufficiently small response delay as compared with the variations under steady state). Under steady state, the variations in the computed value is reduced with the increase in N. If the computation is made with a small N also in this region, the large variations under steady conditions would increase the error with the required value. Consequently, N should be reduced to increase the response only in initial stages of acceleration where the response delay is large, and subsequently N should be increased to improve the stability in such a region where the variations in $V_{mean}$ are larger than the response delay. Take the case of FIG. 15B, for example. N should be set to four in the region of $n \leq 32$ from the start of acceleration, to 8 for the region $32 < n \leq 6$, and to 16 for the region of N larger than 64 respectively. In other words, it is both meaningless and sacrifices the stability if N is reduced in the regions of small response delay.

This fact will be explained more in detail, the error e between the required value and the computed value is given as a variation $V_S$ of computation due to the variation in the input value and the response delay $V_r$ (which is an error caused when the input value is completely free of variations and the required value is always inputted). In the case where the required value undergoes a change larger than the variations in the computed value under steady state $(V_r >> V_s)$, the relationship $e = V_r + V_s \approx V_r$ results. Comparison between the causes of 4 and 8 in N, for instance, shows that $e_4 < e_8$, where affixes indicate the values of N respectively. With the increase in n and the response delay reduced below the variations $(V_s >> V_r)$, however, the relations change to $$e = V_r + V_s \approx V_s$$

In this case, the larger the value N, the smaller the value $V_s$, naturally resulting in the relationship $e_8 < e_4$ (Of course, $e_{16} < e_8$).

In short, $e_4$ is smaller than $e_8$ in initial stages where the input value underwent a sudden change, but with the increase in n, the relationship is reversed as $e_4$ becomes large than $e_8$. In this way, even when the required value is undergoing a change, there exist two different regions where small and large values of N are more advantageous respectively. If computation is made with a small N in the latter region, stability will be adversely affected. For this reason, the amount of $V_{mean}$ or $V_M$ updated each time is increased only during a predetermined period after the engine comes to satisfy specified conditions.

Although the same specified conditions are set for increasing the amount of $V_{mean}$ and $V_M$ updated in the aforementioned embodiments, specified conditions may be set separately. The specified conditions for $V_{mean}$, for instance, may be
  (a) heavy load, and
  (b) The engine speed higher than a predetermined value, while requiring, as the specified conditions for $V_M$, that
  (c) Heavy load,
  (d) Engine speed within a predetermined range, and
  (e) Engine speed change smaller than a predetermined level. The conditions proposed in (b) and (e) above are reverse to each other due to the fact that $V_{mean}$ is to be used for preparing a knock decision level and $V_M$ for correction under quasi-steady state. Specifically, $V_{mean}$ is required to be followed in any transient conditions, while $V_M$ may be followed only during a comparatively slow transient period.

In the aforementioned embodiment, the correction of a knock decision level is prohibited for a predetermined period after establishment of specified conditions. This is due to the strong possibility of correction with a large error in response delay of $V_M$ during such a period. Also, a large response delay of $V_{mean}$ would make knock decision inaccurate. As a result, during such a period, it is also effective to prohibit the learning of a quantity of retardation angle or knock decision level.

Further, instead of specifying a predetermined period of time by the number of ignitions as in the aforementioned embodiment, it may of course alternatively be specified by time.

It will thus be understood from the foregoing description that according to the present invention, the unit quantity of change of at least one of $V_{mean}$ and $V_M$ is increased during a predetermined time after the engine comes to satisfy specified conditions, whereby both the stability and response of at least one of the average of the knock intensity value and the accumulated percentage point of distribution thereof are improved, thereby realizing an always accurate knocking control.

We claim:

1. A knock control system for the internal combustion engine, comprising a knock sensor for detecting a knocking of the internal combustion engine, knock intensity value detection means for detecting a knock intensity value V effective for knock detection from a signal produced by the knock sensor, knock decision means for deciding the presence or absence of a knocking by comparing the knock intensity value with a knock decision level, knock control means for controlling knock control factors in accordance with the result of the decision, cumulative percentage point detection means for detecting a cumulative percentage point $V_P$ of distribution of a substantially logarithmic conversion value of the knock intensity value, standard deviation detection means for detecting a value S corresponding to the standard deviation of the substantially logarithmic conversion value of the knock intensity value V, and knock decision level preparation means for preparing the knock decision level $V_{KD}$ on the basis of the cumulative percentage point $V_P$ and the value S corresponding to the standard deviation.

2. A knock control system for the internal combustion engine according to claim 1, wherein said knock decision level preparation means prepares a knock decision level $V_{KD}$ in the form of $S^n \times V_P$ wherein n is a constant.

3. A knock control system for the internal combustion engine according to claim 1, wherein said cumulative percentage point $V_P$ is provided by a cumulative 50% point $V_M$.

4. A knock control system for the internal combustion engine according to claim 3, wherein said standard deviation detection means updates the value S corresponding to the standard deviation in such a manner that the probability of attaining the relationship $V_M/S \leq V \leq V_M$ is one third.

5. A knock control system for the internal combustion engine according to claim 3, wherein said knock decision level preparation means prepares the knock decision level $V_{KD}$ in the form of $S^3 \times V_M$.

6. A knock control system for the, internal combustion engine according to claim 3, further comprising correction means for correcting the knock decision level prepared on the basis of the cumulative 50% point $V_M$ and the value S corresponding to the standard deviation, by a predetermined constant.

7. A knock control system for the internal combustion engine according to claim 1, further comprising engine condition detection means for detecting that the engine enters specified conditions, period decision means for deciding whether a predetermined period has passed after detection of the specified conditions by said engine condition detection means, and update quantity setting means for increasing the unit quantity of updating the cumulative percentage point only while the decision means decides that the predetermined period has not passed.

8. A knock control system for the internal combustion engine according to claim 7, wherein said engine condition detection means detects that the engine is under acceleration as said specified condition.

9. A knock control system for the internal combustion engine according to claim 7, wherein said engine condition detection means detects as the specified conditions at least one of the facts that the internal combustion engine is in a heavy load region, that the change in engine speed is more than a predetermined value, and that the engine speed is within a predetermined range.

10. A knock control system for the internal combustion engine comprising a knock sensor for detecting a knocking of the internal combustion engine, knock intensity value detection means for detecting a knock intensity value from a signal produced by the knock sensor, knock decision level preparation means for preparing a knock decision level in accordance with an output of the knock intensity value detection means, knock decision means for deciding on a knocking by comparing the knock decision level with the knock intensity value, knock control means for controlling knock control factors in accordance with the result of knock decision of the knock decision means, engine condition detection means for detecting that the engine has entered specified conditions, period decision means for deciding whether a predetermined period has passed after detection of the specified conditions by the engine condition detection means, and update quantity setting means for increasing the unit quantity of updating the knock decision level only while the decision means decides that the predetermined period has not yet passed.

11. A knock control system for the internal combustion engine according to claim 10, wherein said engine condition detection means detects that the internal combustion engine is under acceleration as said specified condition.

12. A knock control system for the internal combustion engine according to claim 10, wherein said engine condition detection means detects as one of the specified conditions at least one of the facts that the internal combustion engine is in a heavy load region, that the change in engine speed is more than a predetermined value, and that the engine speed is within a predetermined range.

13. A knock control system for the internal combustion engine according to claim 10, further comprising cumulative percentage point detection means for detecting the cumulative percentage point of distribution of a knock intensity value detected by the knock intensity value detection means, said knock level preparation means preparing said knock decision level on the basis of said cumulative percentage point, said updating quantity setting means increasing the unit quantity of updating the cumulative percentage point.

14. A knock control system for internal combustion engine according to claim 10, further comprising averaging means for averaging the knock intensity values detected by said knock intensity value detection means, said knock decision level preparation means preparing a knock decision level on the basis of the average of the knock intensity value, said update quantity setting means increasing the unit quantity of updating the average value.

* * * * *